(12) United States Patent
Lafont et al.

(10) Patent No.: US 9,011,098 B2
(45) Date of Patent: Apr. 21, 2015

(54) PROPELLER FOR AN AIRCRAFT TURBINE ENGINE COMPRISING A VANE RETAINING RING MOUNTED ABOUT THE HUB

(75) Inventors: Laurent Lafont, Pechbusque (FR); Damien Prat, Colomiers (FR); Lionel Diochon, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 783 days.

(21) Appl. No.: 13/260,130

(22) PCT Filed: Apr. 6, 2010

(86) PCT No.: PCT/FR2010/050651
§ 371 (c)(1),
(2), (4) Date: Dec. 7, 2011

(87) PCT Pub. No.: WO2010/116080
PCT Pub. Date: Oct. 14, 2010

(65) Prior Publication Data
US 2012/0070287 A1    Mar. 22, 2012

(30) Foreign Application Priority Data
Apr. 7, 2009 (FR) ..................... 09 52270

(51) Int. Cl.
*B64C 11/04* (2006.01)
*B64C 11/06* (2006.01)
(Continued)

(52) U.S. Cl.
CPC .............. *B64C 11/06* (2013.01); *F01D 21/045* (2013.01); *F04D 29/323* (2013.01); *Y02T 50/66* (2013.01); *Y02T 50/672* (2013.01)

(58) Field of Classification Search
CPC ........ B64C 11/04; B64C 11/06; B64C 11/08; B64C 11/10; B64C 11/12; B64C 27/48
USPC ............. 416/147, 148, 204 R, 207, 208, 209, 416/220 R
See application file for complete search history.

(56) References Cited

U.S. PATENT DOCUMENTS 1,769,801 A * 7/1930 McCauley .................... 416/207
1,870,401 A * 8/1932 Caldwell ....................... 416/207
(Continued)

FOREIGN PATENT DOCUMENTS

EP    0 368 182 A2    5/1990
EP    0 368 182 A3    5/1990
(Continued)

OTHER PUBLICATIONS

International Search Report with Written Opinion of Searching Authority issued Jul. 22, 2010, in Patent Application No. PCT/FR2010/050651. (with Translation of Category of Cited Documents).

*Primary Examiner* — Dwayne J White
*Assistant Examiner* — Adam W Brown
(74) *Attorney, Agent, or Firm* — Oblon, McClelland, Maier & Neustadt, L.L.P.

(57) ABSTRACT

A propeller for an aircraft turbine engine comprising a plurality of vanes as well as a hub having a plurality of accommodating ports receiving the bases of said vanes, each vane base being rotatably mounted in its associated accommodating port. The propeller also has at least one vane retaining ring structure in the radial direction outwardly from the hub, being cladded around the latter.

18 Claims, 4 Drawing Sheets

(51) Int. Cl.
   *F01D 21/04*   (2006.01)
   *F04D 29/32*   (2006.01)

(56) References Cited

U.S. PATENT DOCUMENTS

| | | |
|---|---|---|
| 3,515,501 A | 6/1970 | Palfreyman et al. |
| 5,028,207 A | 7/1991 | Rohra et al. |
| 5,112,191 A | 5/1992 | Strock et al. |
| 5,224,831 A | 7/1993 | Hermans et al. |
| 6,015,264 A * | 1/2000 | Violette et al. ............ 416/146 A |
| 2010/0215499 A1 | 8/2010 | Lafont |
| 2012/0121417 A1 | 5/2012 | Lafont |

FOREIGN PATENT DOCUMENTS

| | | |
|---|---|---|
| FR | 1 575 682 | 7/1969 |
| FR | 2 645 499 A1 | 10/1990 |

* cited by examiner

PROPELLER FOR AN AIRCRAFT TURBINE ENGINE COMPRISING A VANE RETAINING RING MOUNTED ABOUT THE HUB

TECHNICAL FIELD

The present invention generally relates to turbine engine propellers for aircraft. It is applicable in particular to so-called "open rotor" turbojets, turboprops and turbine engines.

STATE OF PRIOR ART

In reference to FIG. 1, it is represented a part of a propeller 1 of an open rotor type aircraft turbine engine, this propeller 1 being provided with a plurality of vanes 2, a single one of which is visible in this FIG. 1. For information, as is known, such a turbine engine comprises two contrarotating propellers, with for example one propeller rotationally integral with a first power-free turbine and the other propeller being rotationally integral with a second power-free turbine, provided downstream of the one propeller.

The propeller 1, with a longitudinal axis 3, includes a hub 4 centred on this axis and having a plurality of accommodating ports 5 circumferentially distributed, each receiving the base 8 of one the vanes 2. For this, the accommodating ports 5 are made so as to pass through the hub, each by radially extending in the direction of the vane they accommodate, respectively. As visible in FIG. 1, each vane 2 has its base 8 rotatably mounted on the hub 4 about an axis 10, for example using a ball bearing system 12 located between the base 8 and the accommodating port 5. In this manner, using a suitable variable spacing system (not represented) judiciously cooperating with the vane 2, the latter being permanently pivoted during operation of the turbine engine, depending on the desired incidence.

The base 8 radially outwardly extends up to the outlet of its accommodating port 5 provided in the hub. Moreover, the vane comprises a blade part 14 lying in the jet, integrating a mechanical connection 18 with a reduced cross-section connecting it to the base 8. Although not represented, this connection 18 can be integral with a tulip shaped piece, the head of which is accommodated within the blade part 14, and the tulip stem consists of this connection 18 with a reduced cross-section. Furthermore, the tulip can be made as a single piece with the base 8, for example of composite material, preferably comprising a blend of glass and/or carbon fibres with resin.

Regarding the blade part 14, only a portion of its streamlined hull 24 has been represented, this hull forming, between a leading edge 26 and the trailing edge 28, the lower surface and the upper surface of the blade. This hull is also preferentially made as a single piece, for example of a composite material, preferably comprising a blend of glass and/or carbon fibres with resin.

The hub 4 has thus the accommodating ports 5 circumferentially distributed, and made so as to be through holes. Furthermore, via these ports 5, the hub allows for retaining the vanes 2 in the radial direction outwardly.

If this technical solution is widespread, it has nevertheless the drawback that in case of a failure occurring in the hub, there is a not inconsiderable risk of losing the vane.

SUMMARY OF THE INVENTION

One object of the invention is thus to provide a propeller for an aircraft turbine engine at least partially remedying the above-mentioned drawback, relating to systems of prior art.

For this, one object of this invention is a propeller for an aircraft turbine engine comprising a plurality of vanes as well as a hub having a plurality of accommodating ports receiving the bases of said vanes, each vane base being rotatably mounted in its associated accommodating port. According to the invention, said propeller also has at least one vane retaining ring structure in the radial direction outwardly from the hub, being cladded around the latter.

Thus, in case of a failure of the hub in its vane retaining function in the radial direction outwardly, one or more dedicated structures can continue to fulfil this role. The vane loss risks are thus substantially reduced thanks to this additional retaining structure, the placement of which around the hub turns out to be particularly easy.

Preferably, each vane retaining ring structure is provided with at least a tightening device in the circumferential direction. This device, similar to a tensioner, therefore allows to provide an appropriate tightening of the retaining ring structure, about the hub.

Preferably, for each vane retaining ring structure, a groove is provided circumferentially extending on one of the two elements among the hub and the structure, as well as a projection circumferentially extending on the other of said two elements, and accommodated in said groove.

This assembly allows to obtain a good hold of the retaining ring structure on the hub of the propeller, since these circumferential elements prohibit a relative movement in the axial direction between the structure and the hub. Above all, upon tightening the structure, this can be relatively moved with respect to the hub along the circumferential direction by relatively sliding the projection in the groove, without the risk of being axially moved with respect to the hub.

Preferably, each structure is made from at least two angular sectors mounted one to the other. This makes it easier mounting the retaining structure onto the hub.

Finally, two structures are preferably provided, respectively provided on either side of the transverse plane integrating the axes of rotation of the vanes. Thus, in case of a failure of one of the two structures, the other remains active and can ensure alone the vane retaining in the radial direction outwardly. This provides a safety function in case of a failure, also called the "Fail Safe" function.

Another object of the invention is also a turbine engine for an aircraft comprising at least one propeller such as that described above.

Preferentially, a turbine engine is a turbojet, a turboprop or an "open rotor". Thus, in the case of a turbojet, the vanes of the blower, whereas in the next two cases, it is about the vanes of the propellers.

Finally, another object of the invention is an aircraft comprising a plurality of turbine engines such as that mentioned above.

Further advantages and characteristics of the invention will become clearer from the non-limiting detailed description given below.

BRIEF DESCRIPTION OF THE DRAWINGS

This description will be made with regard to the appended drawings wherein.

DETAILED DESCRIPTION OF PREFERRED EMBODIMENTS

Figure 1:
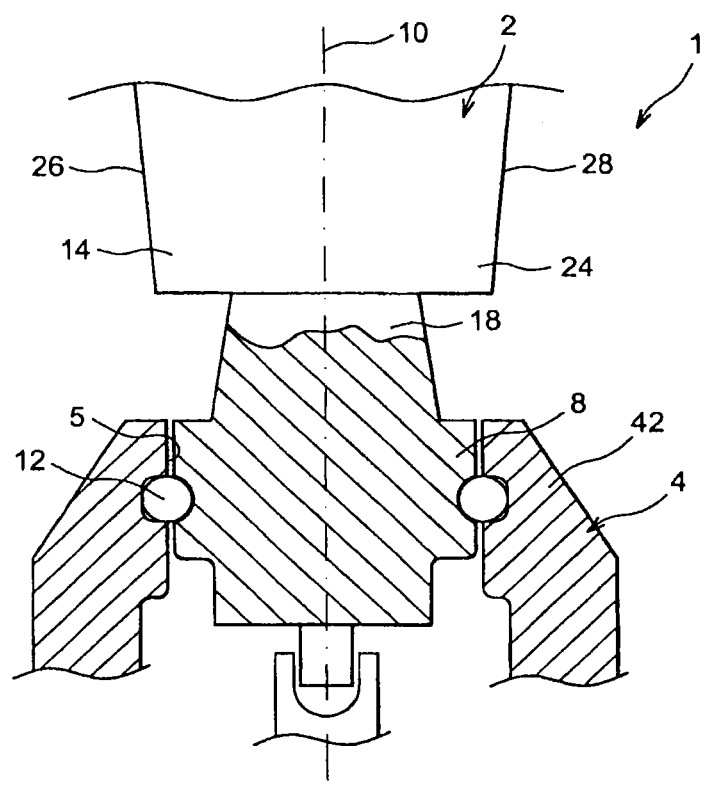
FIG. 1, already described, represents a partial half-cut longitudinal front view of a propeller known in the prior art, this schematic view being also applicable to the present invention.
Figure 2:
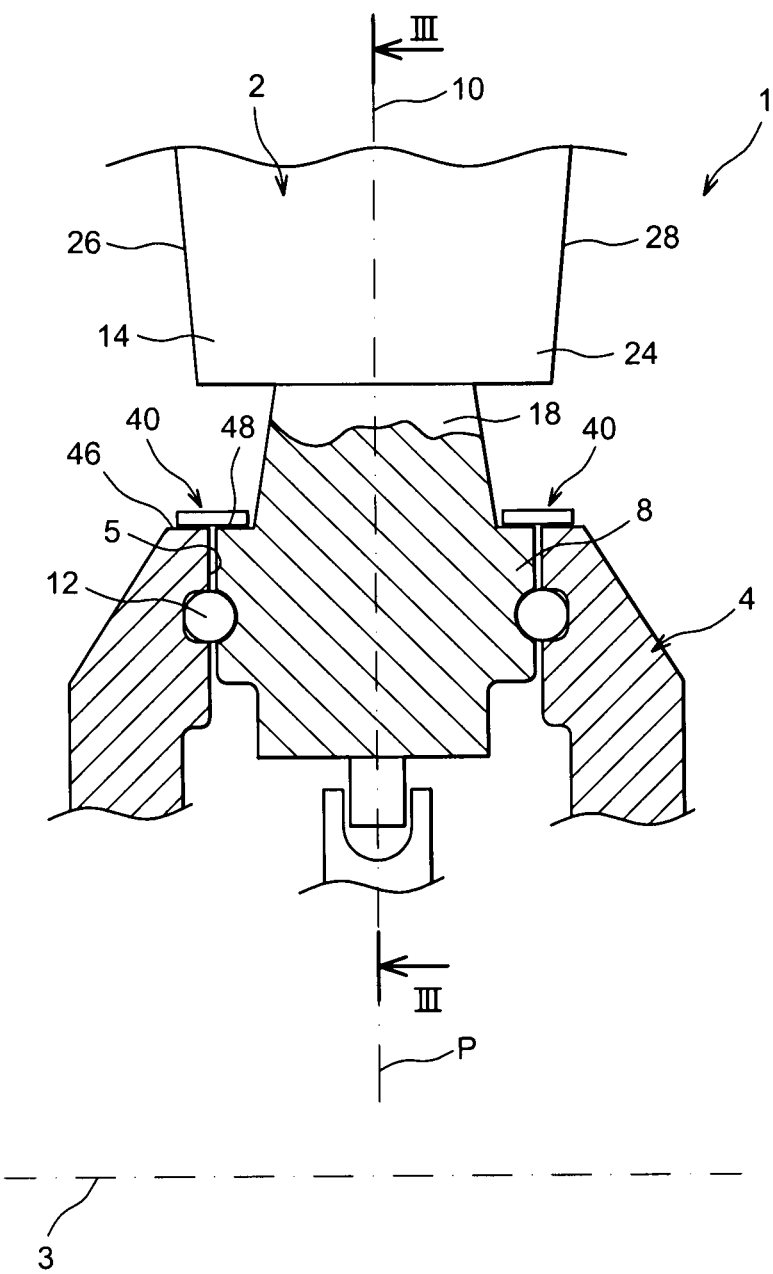
FIG. 2 represents a partial half-cut longitudinal front view of a propeller according to a preferred embodiment of the present invention.

In reference to FIG. 2, there is seen an "open rotor" type turbine engine propeller 1 according to a preferred embodiment of the present invention, in which turbine engine two contrarotating propellers are respectively rotationally driven by two power-free turbines. This propeller 1 has all the characteristics of the propeller shown in FIG. 1. Besides, in the figures, elements having the same number references correspond to identical or similar elements.

Thus, it can be seen in this preferred embodiment that two structures 40 providing retaining ring for the vanes 2 in the radial direction outwardly have been added. These two structures 40 are respectively provided on either side of a transverse plane P integrating the axes of rotation 10 of the vanes, and more precisely on either side of the connections 18 thereof, by a distance from which they are positioned.

The structures 40 are outwardly cladded on the hub 4. Indeed, as can be seen in FIG. 2, each structure 40 is preferentially cladded against the outside surface 46 of the hub at which the ports 5 emerge, and also preferentially against the top surface 48 of the vane base 8.

Figure 3:
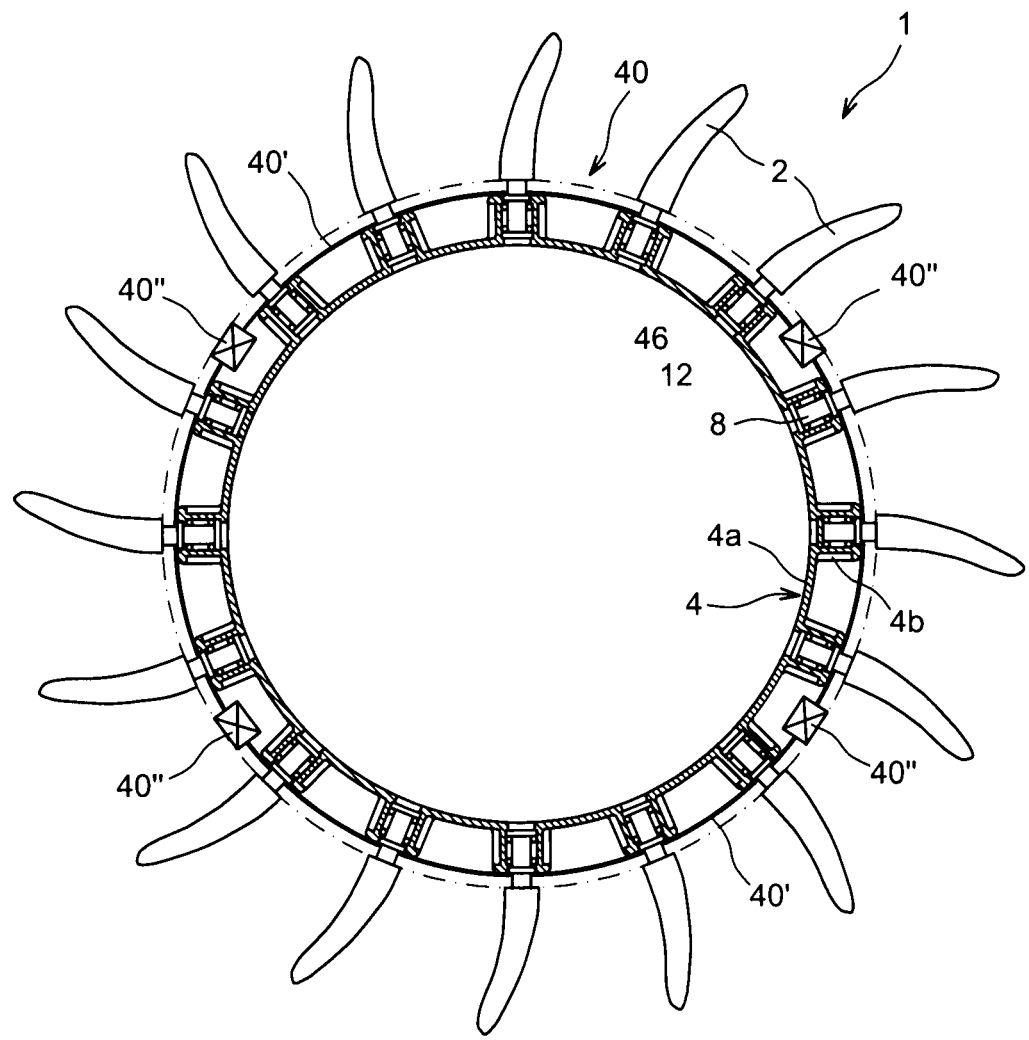
FIG. 3 represents a cross-section view taken along line III-III of FIG. 2.

In FIG. 3, it can be seen that the hub 4 has the form of an annular base 4a through which are provided the accommodating ports 5 which are circumferentially distributed, each of which radially extending outwardly via a flange 4b. Besides, it is in this flange 4b that is preferentially arranged the ball bearing system 12 for cooperating with the base 8 in order to allow pivoting of the vane in its port 5, and thus to adjust its incidence.

Here, the outside surface 46 of the hub, against which the retaining structure 40 is cladded thus consists of the radially outer ends of the flanges 4b. Consequently, the parts of the retaining structure 40 arranged between consecutive flanges 4b lie facing away the base 4a of the hub 4 radially positioned inwardly.

In a preferred embodiment, the structure 40 is sectored in order to make the mounting thereof easier. Consequently, a plurality of ring angular sectors 40' are provided mounted end to end by lock/unlock devices 40". The number of ring angular sectors 40', identical to the number of lock/unlock devices 40", is for example between three and six. Furthermore, the sectors 40' are preferably of the same angular length.

In the preferred embodiment represented in FIG. 3, among the four lock/unlock devices 40" inserted between the four ring sectors 40', at least one of them further fulfils a tightening function in the circumferential direction. By actuating this device 40", thus similar to a tensioner, the structure 40 has its circumferential length decreased, which results in an increased tightening of the hub 4.

As has been schematically shown, the lock/unlock devices 40" are preferentially arranged between the flanges 4b of the hub 4, so as to be located at parts of the structure 40 arranged away from the hub, and more precisely away from its base 4a.

Figure 4:
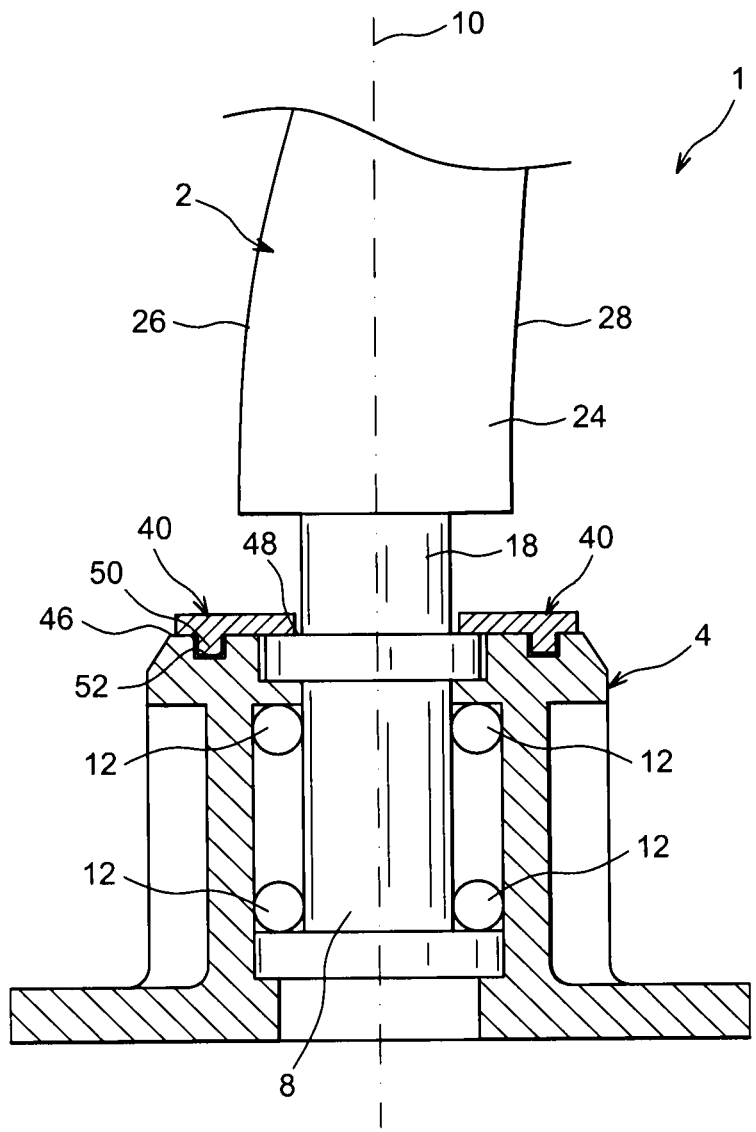
FIG. 4 represents a view similar to that of FIG. 2, on which the propeller is in the form of another preferred embodiment of the present invention.

In the other embodiment shown in FIG. 4, there has been further added for each structure 40, on the angular sectors defining it, a projection 50 circumferentially and radially extending outwardly, by being centred on the axis 3. This projection 50, which can thus be interrupted in the circumferential direction because of the sectorization of the structure 40, is accommodated in a groove 52 circumferentially extending and radially open outwardly, by being centred on the axis 3. This groove 52 is provided on the hub 4, and more precisely on its outside surface 46. Thus, each of both grooves 52 is therefore interrupted along the circumferential direction between the flanges 4b which define the outside surface 46.

With this configuration, upon tightening the structure 40 by the devices 40", this structure can be relatively moved with respect to the hub 4 along the circumferential direction by relatively sliding the projection 50 into the groove 52, without the risk of being axially moved with respect to the hub 4.

Of course, various alterations can be made by those skilled in the art to the invention just described, only by way of non-limiting examples.

The invention claimed is:

1. A propeller for an aircraft turbine engine comprising:
a plurality of vanes;
a hub having a plurality of accommodating ports receiving bases of said vanes, each said vane base being rotatably mounted in its associated accommodating port; and
at least one vane retaining ring structure positioned circumferentially around and radially outward from the hub, each vane retaining ring structure being cladded around an outside surface of the hub and extending over each of the plurality of accommodating ports so as to retain the plurality of vane bases therein.

2. The propeller according to claim 1, wherein each vane retaining ring structure is provided with at least a tightening device in the circumferential direction.

3. The propeller according to claim 1, wherein for each vane retaining ring structure, a groove is provided circumferentially extending on one of the two elements from the hub and the structure, as well as a projection circumferentially extending the other of said two elements, and accommodated in said groove.

4. The propeller according to claim 1, wherein each structure is made from at least two angular sectors mounted one to the other.

5. The propeller according to claim 1, wherein two structures are provided, respectively on either side of a transverse plane integrating the axes of rotation of the vanes.

6. A turbine engine comprising at least a propeller according to claim 1.

7. An aircraft comprising a plurality of turbine engines according to claim 6.

8. A propeller for an aircraft turbine engine comprising a plurality of vanes as well as a hub having a plurality of accommodating ports receiving the bases of said vanes, each vane base being rotatably mounted in its associated accommodating port,
wherein said propeller also has at least one vane retaining ring structure in the radial direction outwardly from the hub, being cladded around the latter, and
wherein two structures are provided, respectively on either side of a transverse plane integrating the axes of rotation of the vanes.

9. A propeller for an aircraft turbine engine comprising:
a hub that includes a plurality of accommodating ports arrayed circumferentially around the hub;
a plurality of vanes, each vane respectively including a vane base that is rotatably mounted in a respective one of the plurality of accommodating ports; and
a first vane retaining ring structure positioned radially outward from the hub and extending circumferentially around the hub to retain the plurality of vanes in the hub.

10. The propeller according to claim 9, wherein the first vane retaining ring structure includes a tightening device that tightens the vane retaining ring in the circumferential direction.

11. The propeller according to claim 9, wherein one of the first vane retaining ring structure and the hub include a first circumferentially extending groove, and the other of the first vane retaining ring structure and the hub include a first circumferentially extending projection, the first vane retaining ring structure and the hub positioned so that the first circumferentially extending projection is accommodated in the first circumferentially extending groove.

12. The propeller according to claim 9, wherein the first vane retaining ring structure includes at least two angular sectors mounted one to the other.

13. The propeller according to claim 9, further comprising a second vane retaining ring structure positioned radially outward from the hub and extending circumferentially around the hub to retain the plurality of vanes in the hub, the first and second vane retaining ring structures positioned, respectively on opposite sides of a transverse plane that includes the axes of rotation of the plurality of vanes.

14. The propeller according to claim 13, wherein the second vane retaining ring structure includes a second tightening device that tightens the vane retaining ring in the circumferential direction.

15. The propeller according to claim 13, wherein one of the second vane retaining ring structure and the hub include a second circumferentially extending groove, and the other of the second vane retaining ring structure and the hub include a second circumferentially extending projection, the second vane retaining ring structure and the second hub positioned so that the second circumferentially extending projection is accommodated in the second circumferentially extending groove.

16. The propeller according to claim 13, wherein the second vane retaining ring structure includes at least two angular sectors mounted one to the other.

17. A turbine engine comprising at least a propeller according to claim 9.

18. An aircraft comprising a plurality of turbine engines according to claim 17.

* * * * *